July 10, 1951 — E. E. LUNDBERG ET AL — 2,560,459
LOCKING MECHANISM FOR CONVERTIBLE TOPS
Filed Sept. 10, 1947 — 3 Sheets-Sheet 1
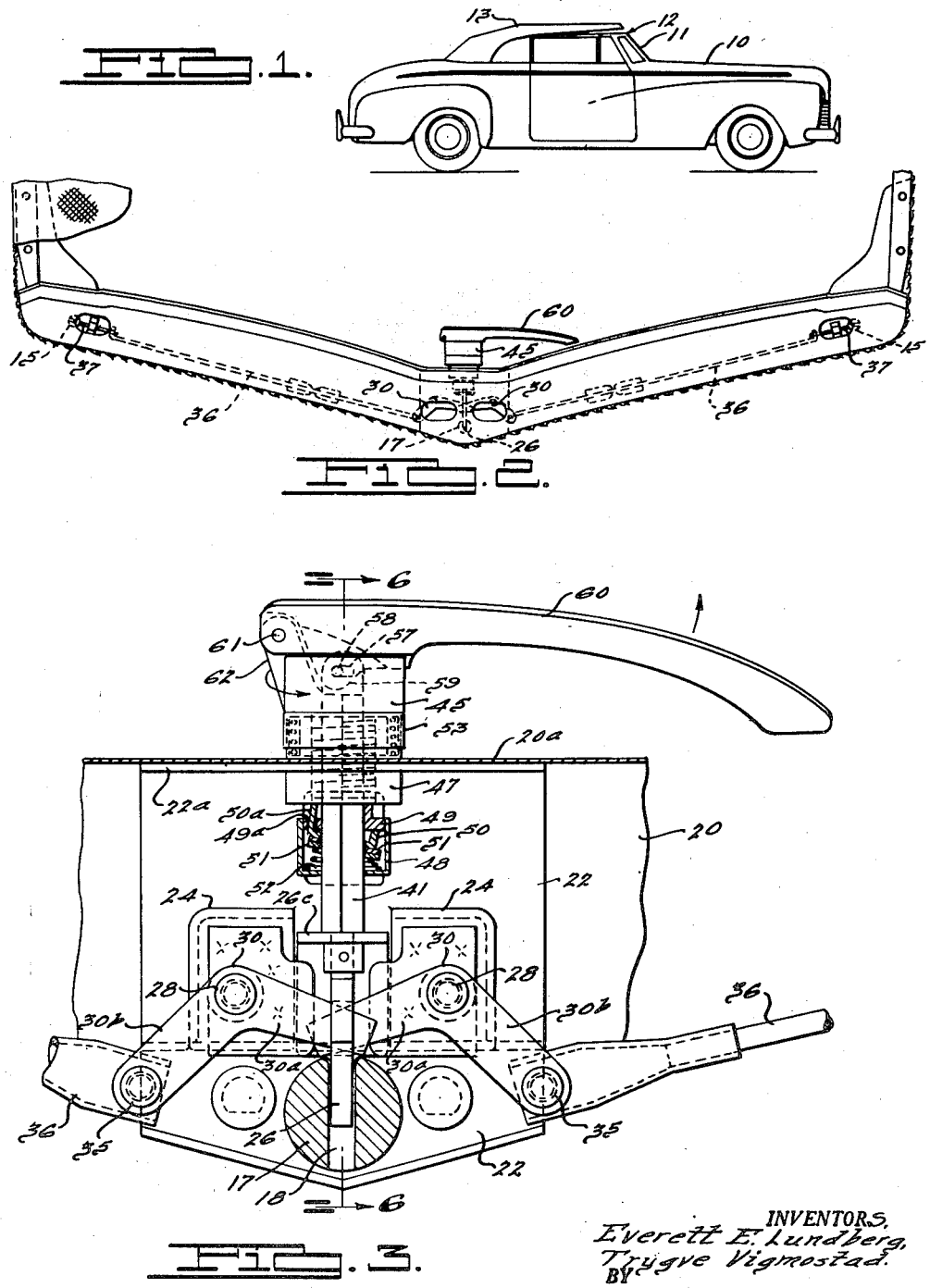
INVENTORS,
Everett E. Lundberg,
Trygve Vigmostad.
BY
ATTORNEY.

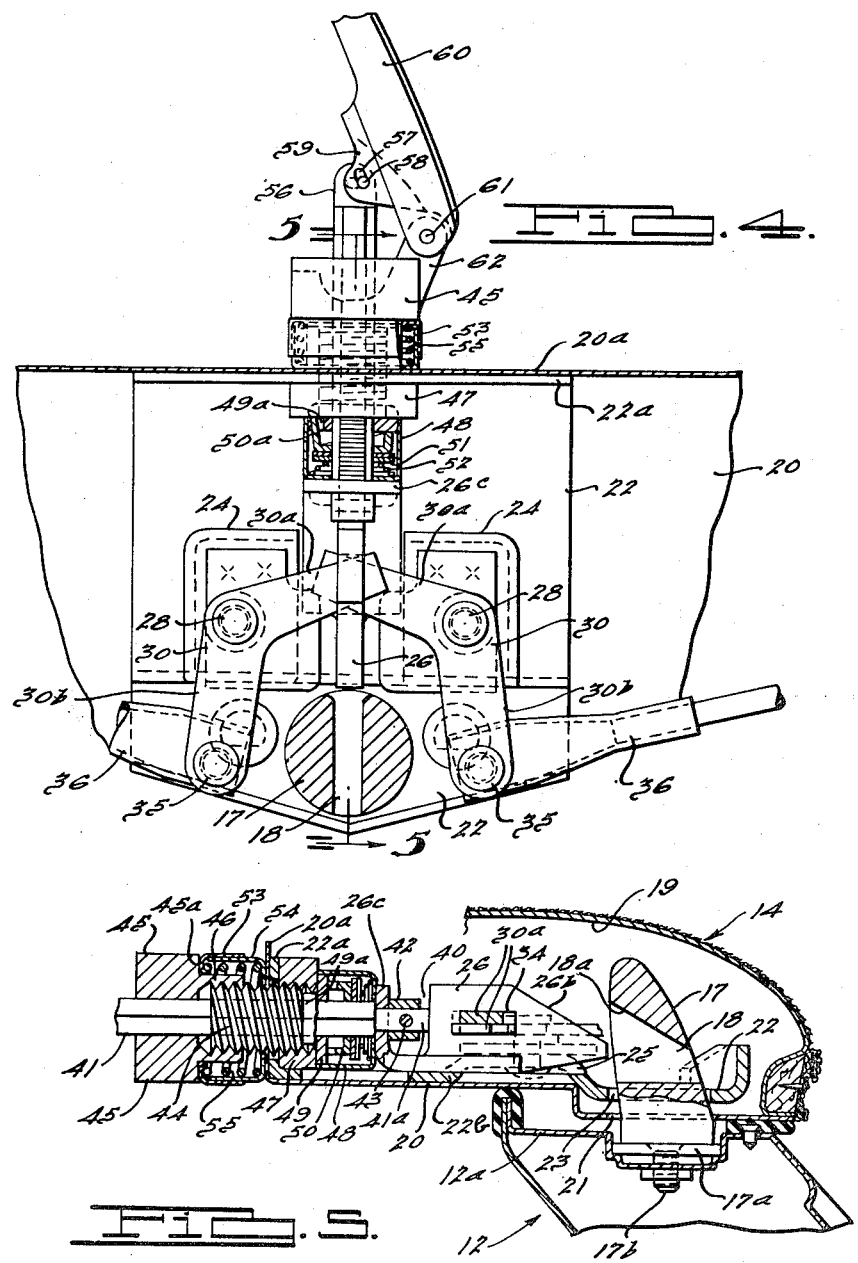

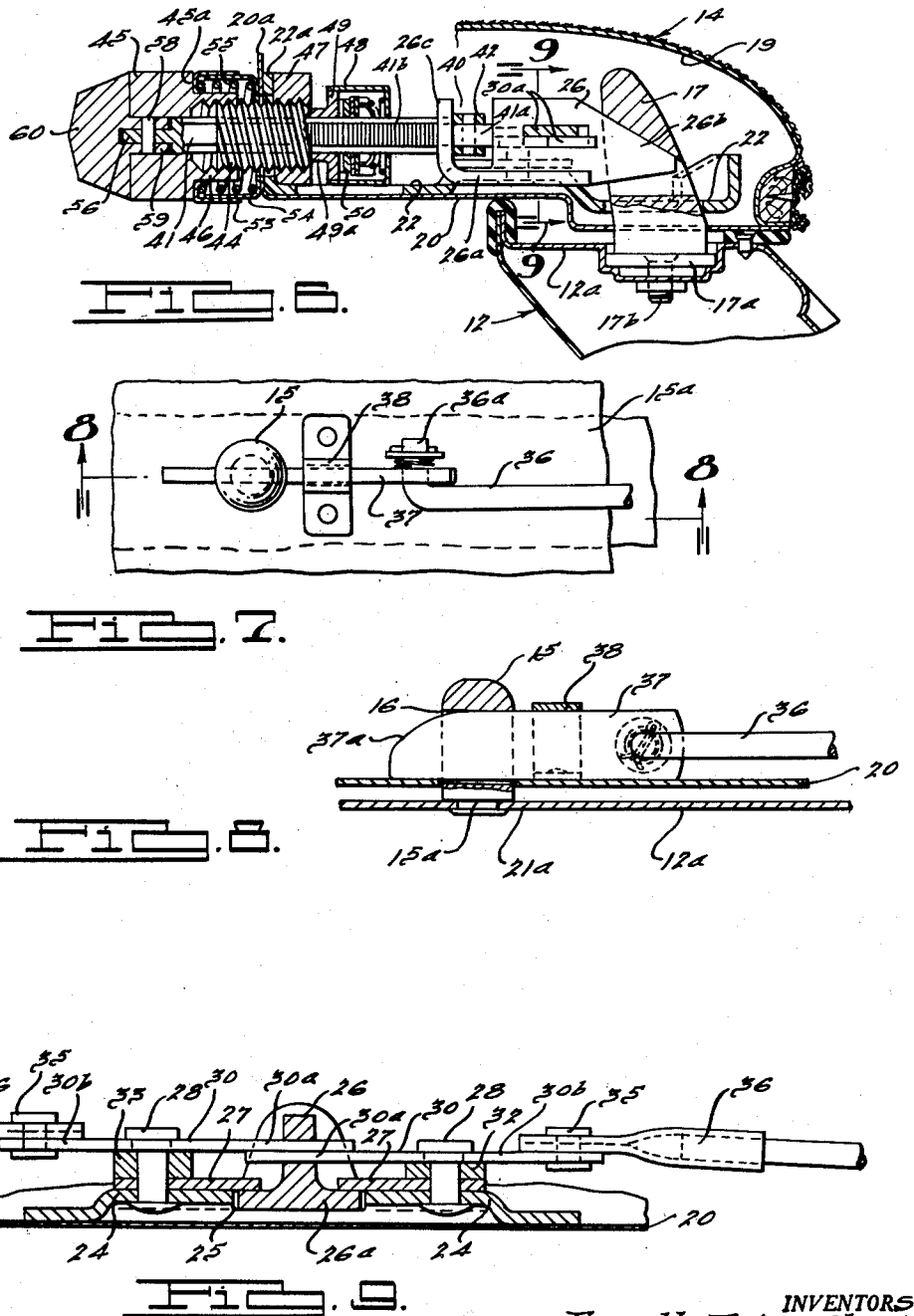

Patented July 10, 1951

2,560,459

UNITED STATES PATENT OFFICE 2,560,459

LOCKING MECHANISM FOR CONVERTIBLE TOPS

Everett E. Lundberg and Trygve Vigmostad, Detroit, Mich., assignors to Briggs Manufacturing Company, Detroit, Mich., a corporation of Michigan Application September 10, 1947, Serial No. 773,276

16 Claims. (Cl. 296—120)

This invention relates to vehicle bodies, especially automobile bodies, of the convertible type in which the body is provided with a foldable top adapted to be folded into a unit at the rear of vehicle and also adapted to be unfolded into open position with the front transverse header of the top engageable with the upper edge of the windshield structure and locked thereto.

An object of the invention is to provide an efficient, reliable and easily operable means of improved construction for locking the front header of the foldable top to the windshield structure.

A further object of the invention is to provide improved locking means conveniently accessible to the operator of the vehicle for locking the header of the foldable top to the windshield structure, said means including a movable centrally located locking device cooperable with a member on the windshield structure and improved means for operating said device. As a particular feature of the invention the means for operating the locking device is longitudinally movable and is adapted to be restrained against longitudinal movement when in locking position, such as by a clutch device.

Another object of the invention is to provide a locking means of the foregoing kind wherein a common manually operable means, such as a handle, is provided for operating both the locking device or devices and the clutch device or other restraining means.

Still another object of the invention is to provide means for locking the header of the foldable top to the windshield at three points through the medium of a longitudinally movable locking device at the central part of the header and two oppositely movable locking devices adjacent opposite ends of the header, said devices being connected for simultaneous operation preferably by means of bell crank levers actuated by the central locking device, and the latter being moved by means of longitudinally shiftable means which is capable of being locked or restrained against longitudinal movement, when the locking devices are in locked positions, through the medium of a restraining means, such as a clutch device.

A further object of the invention is to provide a locking means of the foregoing character in which a single handle is provided for shifting the central locking device into and out of locking position and also for actuating the clutch device or other restraining means, the handle being preferably mounted for fore and aft pivotal motion to shift the locking device and for rotative motion for actuating the clutch device or restraining means.

Another object of the invention is to provide on the header of the foldable top a longitudinally shiftable centrally located device and laterally shiftable end locking devices connected together for simultaneous operation, the central locking device being connected to a longitudinally shiftable member which in turn is pivotally connected to a handle lever adapted to be grasped and swung fore and aft so as to shift said member positively and with a minimum of effort in order to engage or disengage the locking devices. A further preferred feature of the invention is to mount the handle for rotative motion and to provide means responsive to such rotative motion for actuating a clutch device or other means for restraining movement of the locking devices and their actuating means when the locking devices are in locking positions.

Other objects of this invention will appear in the following description and appended claims, reference being had to the accompanying drawings forming a part of this specification wherein like reference characters designate corresponding parts in the several views.

Fig. 1 is a side elevation on a reduced scale of a convertible automobile embodying the present invention.

Fig. 2 is a fragmentary plan view of the front transverse header of the foldable top installed on the body shown in Fig. 1.

Fig. 3 is an enlarged fragmentary horizontal sectional view taken through the central portion of the header and illustrating a portion of the locking mechanism in plan view, the mechanism being shown in locked position.

Fig. 4 is a view similar to Fig. 3 but illustrating the mechanism in unlocked position.

Fig. 5 is a section taken substantially through lines 5—5 of Fig. 4 looking in the direction of the arrows.

Fig. 6 is a section taken substantially through lines 6—6 of Fig. 3 looking in the direction of the arrows.

Fig. 7 is a fragmentary plan view of the locking mechanism at one end of the header.

Fig. 8 is a section taken substantially through lines 8—8 of Fig. 7 looking in the direction of the arrows.

Fig. 9 is a section taken substantially through lines 9—9 of Fig. 6 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated a convertible body equipped with a foldable top and locking mechanism constructed in accordance with one embodiment of the present invention. The body 10 is provided with a windshield structure 11 which is of generally V-shape and terminates at its upper edge in a transverse generally V-shaped windshield header 12 provided with a top horizontal jamb member 12a. The convertible top 13 may be of any conventional construction adapted to be folded into a unit at the rear of the vehicle and also adapted to be unfolded into open position with the front transverse header 14 thereof engageable with the upper edge of the windshield header 12 and locked thereto by mechanism embodying the present invention.

In accordance with the preferred embodiment of the invention the header 14 of the foldable top is drawn down and locked to the fixed windshield header 12 at three points by means of cooperating locking devices located centrally of the header and adjacent opposite ends thereof. Since the end locking devices are identical a description of one thereof will suffice. Referring to Figs. 7 and 8, a vertical locking stud 15 is riveted at 15a to the jamb 12a of the windshield structure 12 at each end thereof. Each stud 15 is provided with a transverse slot 16. At a central point of the windshield header 12 there is provided a central vertically extending locking stud 17. This stud has a base 17a fastened within an embossing in the jamb member 12a by means of bolts and nuts 17b, see Fig. 5. The central stud 17 is provided with a longitudinally extending slot 18 having a rearwardly and upwardly inclined cam face 18a.

The transverse header 14 of the foldable top preferably comprises a hollow sheet metal structure comprising an upper panel 19 flanged along its forward bottom edge and rigidly secured to a bottom panel 20 as by means of spot welding. The bottom panel 20 of the hollow sheet metal header 14 is turned along its rear edge to provide an upwardly extending flange 20a. This bottom panel 20 of the header has apertures 21 at opposite ends through which the end locking studs 15 are adapted to pass freely when the foldable top is brought into locking position against the windshield structure.

Referring particularly to Figs. 3, 5 and 6, there is mounted within the central part of the header 14 a mounting plate 22 which may be rigidly secured to the bottom panel 20 as by means of spot welding. This mounting plate has an aperture 23 aligned with the aperture 21 to receive the stud 17. The mounting plate 22 terminates at its rear edge in an upstanding back flange 22a abutting against the flange 20a and secured thereto. The base 22b of the mounting plate 22, see Figs. 3 and 9, is formed with embossments 24 separated by means of a longitudinal slot 25. Slidably mounted upon the mounting plate 22 is a central locking device 26 which has a wedge shaped forward end 26b adapted to enter the slot 18 in the stud 17 and to draw down the top header against the upper edge of the windshield structure by engagement of the wedge shaped end 26b with the tapered surface 18a of the slot 18. As shown in Fig. 9, the locking member 26 is of generally inverted T-shape having a base 26a shiftable within the slot 25. The locking member 26 is held in position by means of guide plates 27 which overlie opposite edges of the base 26a, the guide plates being held in position by means of shoulder rivets 28. Pivotally mounted upon the rivets 28 are a pair of bell crank levers 30 which are spaced from the guide plates 27 by means of spacer blocks 32 and 33, see Fig. 9. These spacer blocks are of different thicknesses so as to permit the inner angularly extending arms 30a of the bell cranks to overlap and project freely through a transverse slot 34 in the locking member 26, see Fig. 5. The bell crank levers are identical in construction and are positioned reversely to each other, as clearly shown in Figs. 3 and 4. The outer arms 30b of the bell cranks are pivoted at 35 to the inner ends of a pair of links 36. These links extend outwardly in opposite directions through the hollow top header 14 and have their outer ends bent at 36a for connection to a pair of end locking devices 37. These end locking devices are identical in construction and, as shown in Figs. 7 and 8, each terminates in a tapered or wedge shaped end 37a adapted to be projected through the slot 16 in one of the end locking studs 15. Each end locking device 37 is guided in suitable manner as by means of a guide device 38.

From the foregoing construction it will be readily seen that by shifting the central locking member 26 forwardly into locking engagement with the central locking stud 17, the arms 30a of the bell crank levers 30 will be swung forwardly about their pivots 28, thus swinging the outer arms 30b of the bell cranks outwardly in opposite directions. This operation will impart outward movement to the links 36 thereby forcing the end locking members 37 outwardly in opposite directions through the slots 16 in the end locking studs 15. As a consequence of this operation, the top header 14 will be drawn down tightly against the windshield header 12. The construction as well as the mode of operation thus far described is similar to that disclosed in United States Letters Patent No. 2,411,945, issued December 3, 1946.

The base 26a of the central locking member 26 projects rearwardly and is bent up to provide a flange 26c spaced at 40 from the rear edge of the main body of the locking member, see Figs. 5 and 6. This locking member is shifted fore and aft by means of a shaft or rod 41 which is hexagonal in cross section. The forward end 41a of this rod is turned down so as to be round in cross section and this end projects freely through a hole in the flange 26c and abuts against the rear edge of the locking member 26. A collar 42 is pinned at 43 to the reduced end 41a of the rod 41 and abuts against the outer face of the flange 26c. This flange is, therefore, held between the collar 42 and the shoulder at the rear end of the reduced portion 41a so that fore and aft movement of the shaft will impart a corresponding movement to the locking member 26.

Mounted upon the shaft or rod 41 is a threaded sleeve 44 which has a hexagonal bore therethrough to freely receive the shaft 41 so as to permit the latter to be shifted back and forth through the threaded sleeve 44. A cylindrical block 45 is mounted on the shaft or rod 41, this block having a hexagonal bore to freely receive the shaft and permit the latter to be shifted back and forth therethrough. The block 45 has a reduced portion 46 provided with internal threads engaging the threads of the sleeve 44. The latter projects freely through an aperture in the flange 20a of the header panel and also through a corresponding aperture in the flange 22a of the mounting plate 22. The forward end of the threaded sleeve 44 is threaded into the tapped bore of a stationary nut 47 which is rigidly secured to the flange 22a. From the foregoing construction it will be seen that the shaft or rod 41 may slide freely through the block 45 and the threaded sleeve 44, whereas these parts together with the shaft 41 will rotate as a unit upon turning either the shaft 41 or the block 45 or both.

In accordance with the preferred embodiment of the present invention the shaft or rod 41 is adapted to be shifted fore and aft in order to simultaneously operate the central and end locking members 26 and 37 and thereby draw down and lock the top header 14 to the windshield header 12. In addition, a clutch device is provided in order to lock the locking members 26 and 37 positively in their locking positions against any danger of becoming loose during operation of the vehicle. This clutch device is operable in response to rotative motion imparted to the shaft 41 and supporting block 45. In the present instance the clutch device is mounted upon the hex portion of the shaft 41 between the flange 26c of the central locking member and the stationary nut 47, being movable relatively thereto. In the illustrated embodiment the clutch device comprises a cup shaped shell or housing 48 closed at its rear end by means of a cap or disk 49 which is rigidly secured to the clutch housing or shell. The disk 49 is rigidly attached to the threaded sleeve 44, such as by being formed integral therewith. In the present instance the cap 49 is connected to the threaded sleeve 44 by means of a non-threaded extension 49a of the latter, see Fig. 6. Within the clutch housing 48 is located a tiltable cup shaped member 50 which has a central aperture freely receiving the shaft 41 and a projecting tongue 50a adapted to extend through a hole 49a in the disk 49. The cup-shaped member 50 engages a pair of clutch washers 51 apertured so as to freely receive the shaft 41. A compression spring 52 is interposed between the washers 51 and the front wall of the clutch housing. The apertures in the parts 50 and 51 are large enough to permit them to tilt relatively to the shaft in the manner shown in Fig. 3. Interposed between the shoulder 45a on the block 45 and the flange 20a of the header panel 20 are a pair of telescoped shell members 53 and 54 which are slidable relatively to each other and which house a compression spring 55 interposed between opposite flanged edges of the shells 53 and 54, as illustrated in Figs. 5 and 6. Movement of the block 45 toward the flange 20a will result in relative movement of the shell members 53 and 54 and compression of the spring 55. This spring, therefore, constantly exerts a force tending to urge the block 45 away from the flange 20a.

Assuming that the parts are in their respective positions shown in Figs. 4 and 5, it will be seen that the disk 49 of the clutch housing is in engagement with the front face of the nut 47. At this time the end of the tongue 50a will abut against the nut 47 and thereby position the cup 50 and clutch washers 51 at right angles to the shaft 41, thereby freeing the shaft and permitting it to be shifted back and forth through the clutch housing. Accordingly, under these conditions the shaft 41 may be shifted forwardly to engage the locking member 26 with the locking stud 17 in the manner illustrated in Fig. 6. When the central and end locking devices are in substantially full engagement the block 45 and shaft 41 may then be rotated in order to complete the locking operation. Rotation of these parts will produce rotation of the threaded sleeve 44, and since the latter is in threaded engagement with the nut 47 the sleeve will be shifted forwardly a small distance along the shaft 41. This forward movement of the sleeve will be accompanied by a corresponding movement of the clutch housing 48, 49, thereby separating the disk 49 from the nut 47, as shown in Fig. 3. As the clutch housing moves away from the nut 47 the spring 52 tilts the clutch washers 51 and cup 50, due to the fact that the tongue 50a will shift rearwardly through the hole 49a. The tilting of the clutch washers frictionally clamps the edges thereof to opposite serrated portions 41b of the shaft 41, see Fig. 6. Thus, when the clutch has been shifted to the position shown in Fig. 3, by rotation of block 45 and shaft 41, the shaft 41 will be firmly restrained against longitudinal movement. The foregoing operation of the clutch will also shift the central locking member 26 forwardly a small distance and complete the operation of drawing down the top header against the windshield header.

In the present embodiment the rear end of the shaft 41 has a flattened portion 56 provided with a lost motion slot 57 through which extends a pin 58 by means of which the flattened end 56 of the shaft is pivoted within a bifurcated portion 59 of a handle lever 60. This lever, as shown in Figs. 3 and 4, is pivoted at its end adjacent the connection 58 by means of a pivot pin 61 to an integral extension 62 of the block 45. It will be readily seen from this construction that by grasping the handle 60 and pulling it rearwardly in the manner shown in Fig. 4 the shaft 41 will be shifted rearwardly thereby withdrawing the central locking member 26 from the slot 18 in the locking stud 17. Conversely, by swinging the handle 60 forwardly about its pivot 61 from the position of Fig. 4 the central locking member 26 will be forced into locking position within the slot 18. After this operation the handle 60 may be turned, preferably approximately one half turn, as shown by the arrow in Fig. 3 so as to rotate the block 45 and shaft 41 and thereby move the clutch into clamping relation to the shaft 41 in the manner previously described. With the clutch in operative relation to the shaft 41, as shown in Fig. 3, it is impossible to shift the shaft 41 rearwardly by exerting a pull on the handle 60. The locking devices can only be disengaged by first turning the handle 60 approximately one half turn reversely to the direction of the arrow in Fig. 3 so as to move the clutch device from its engaged position in Fig. 3 to its disengaged position in Figs. 4 and 5. When this operation has been accomplished the handle 60 may be pulled rearwardly to disengage the locking devices and permit the top to be folded back into the rear of the body.

We claim:

1. In a vehicle body having a windshield structure, a foldable top including a header, locking means carried by the header and including a locking device at the central portion of the header and two locking devices at opposite ends of the header, the central locking device being shiftable forwardly of the body and the end locking devices being shiftable in opposite directions outwardly of the body and each locking device engageable with a fixed member on the windshield structure, a pair of bell crank levers pivotally mounted on the header to swing about generally vertical axes and each connecting the central locking device with one of said end locking devices, longitudinally slidable means rotatably connected to said central locking device for shifting the latter longitudinally thereby to transmit motion to said end locking devices through said levers, means for shifting said slidable means longitudinally in a rectilinear direction and also for imparting rotative motion thereto, and means controlled by said rotative motion for restraining said slidable means against longitudinal motion.

2. In a vehicle body having a windshield structure, a foldable top including a header, locking means carried by the header and including a locking device at the central portion of the header and two locking devices at opposite ends of the header, the central locking device being shiftable forwardly of the body and the end locking devices being shiftable in opposite directions outwardly of the body and each locking device engageable with a fixed member on the windshield structure, a pair of bell crank levers pivotally mounted on the header to swing about generally vertical axes and each connecting the central locking device with one of said end locking devices, longitudinally slidable means for shifting said central locking device longitudinally to transmit motion to said end locking devices through said levers, clutch means for restraining said slidable means against longitudinal motion, and means for shifting said slidable means longitudinally relative to said clutch means, said last means being rotatable to engage and disengage said clutch means.

3. In a vehicle body, a foldable top including a front transverse header structure, a movable locking device mounted on the central portion of said structure, longitudinally shiftable means for moving said locking device into locking position, clutch means for restraining longitudinal movement of said last means, and manually operable means for shifting said longitudinally shiftable means relative to said clutch means, said manually operable means being rotatable to operate said clutch means.

4. In a vehicle body, a foldable top including a front transverse header structure, a movable locking device mounted on the central portion of said structure, longitudinally shiftable means for moving said locking device into locking position, clutch means for restraining longitudinal movement of said last means, and manually operable means for shifting said longitudinally shiftable means and operating said clutch means, said manually operable means comprising a handle mounted to have fore and aft pivotal motion and also bodily rotative motion.

5. In a vehicle body, a foldable top having a front header, a longitudinally movable locking device carried by the header, shaft means rotatably connected to said device and shiftable longitudinally for moving the same, clutch means on said shaft means operative to prevent longitudinal shifting of the latter, means for shifting said shaft means longitudinally relative to said clutch means, and means for actuating said clutch means upon rotation of said shaft means.

6. In a vehicle body, a foldable top having a front header, a longitudinally movable locking device carried by the header, shaft means rotatably connected to said device and shiftable longitudinally for moving the same, clutch means on said shaft means engageable therewith to prevent longitudinal shifting thereof, means including a manually operable handle for shifting said shaft means longitudinally relative to said clutch means and also for rotating said shaft means relative to said locking device, and means for actuating said clutch means to engage the shaft means upon rotation of the latter.

7. In a vehicle body having a windshield structure, a foldable top having a front header, a longitudinally movable locking device on the header cooperable with a fixed member on the windshield structure, a fore and aft movable shaft having a swivel connection with said device and adapted to move the latter longitudinally, manually operable means connected to said shaft for moving the same longitudinally and also for rotating the same, clutch means movable longitudinally relative to said shaft and operable for engaging the latter upon said relative longitudinal movement to prevent fore and aft movement of the shaft, and means controlled by the rotation of the shaft for moving said clutch means in one direction to engage the same with the shaft and for moving the clutch means in the opposite direction to disengage the same from the shaft.

8. In a vehicle body having a windshield structure, a foldable top having a front header, a longitudinally movable locking device on the header cooperable with a fixed member on the windshield structure, a fore and aft movable shaft having a swivel connection with said device and adapted to move the latter longitudinally, manually operable means including a push and pull pivoted handle connected to said shaft for moving the same longitudinally and also for rotating the same, clutch means engageable with the shaft to prevent fore and aft movement thereof and movable longitudinally relative to the shaft to effect the engagement, and cooperating threaded elements controlled by the rotation of the shaft for moving said clutch means in one direction to engage the same with the shaft and for moving the clutch means in the opposite direction to disengage the same from the shaft.

9. In a vehicle body having a windshield structure, a foldable top including a header, locking means carried by the header and including a locking device at the central portion of the header and two locking devices at opposite ends of the header, the central locking device being shiftable forwardly of the body and the end locking devices being shiftable in opposite directions outwardly of the body and each locking device engageable with a fixed member on the windshield structure, a pair of bell crank levers pivotally mounted on the header to swing about generally vertical axes and each connecting the central locking device with one of said end locking devices, a longitudinally slidable member rotatably connected to said central locking device for shifting the same fore and aft thereby to transmit motion to said end locking devices through said levers, means for shifting said slidable member longitudinally in a rectilinear direction and also for rotating the same, and means controlled by the rotation of said member for restraining the same against longitudinal motion.

10. In a vehicle body having a windshield structure, a foldable top including a header cooperable with said structure, a locking device at the central portion of the header and two locking devices adjacent opposite ends thereof, connecting means between the central locking device and the end locking devices for transmitting motion to the latter from the central locking device, a longitudinally movable member for moving said central locking device into the locking position, a pivotally mounted handle lever connected to said member and adapted to shift the same longitudinally upon imparting pivotal motion to the handle lever, said handle lever and member being bodily rotatable in unison, and means controlled by the rotation of said member for restraining the same against longitudinal motion.

11. In a vehicle body having a windshield structure, a foldable top including a header cooperable with said structure, a locking device at the central portion of the header and two locking devices adjacent opposite ends thereof, connecting means between the central locking device and the end locking devices for transmitting motion to the latter from the central locking device, a longitudinally shiftable member for moving said central locking device into locking position, a support keyed to said member and through which said member is shiftable, a handle lever pivoted to said support and adapted to shift said member longitudinally upon imparting pivotal motion to the handle lever, said handle lever, support and member being rotatable in unison, and means controlled by the rotation of said member for locking said central locking device against longitudinal movement when in locking position.

12. In a vehicle body having a windshield structure, a foldable top including a header cooperable with said structure, a locking device at the central portion of the header and two locking devices adjacent opposite ends thereof, connecting means between the central locking device and the end locking devices for transmitting motion to the latter from the central locking device, clutch means for locking said central locking device against movement when in locking position, means shiftable relative to said clutch means for moving said central locking device into locking position, and a common manually operable means for controlling both of said last two named means.

13. In a vehicle body, a foldable top, a movable locking device for locking said top when unfolded, a member shiftable in one direction for moving said locking device into locking position, a clutch associated with said member in such manner that the member is shiftable relative to the clutch, and means for shifting said member relative to the clutch to move said locking device into locking position, said means being thereafter movable to engage said clutch with said member to hold the locking device in locking position.

14. In a vehicle body, a foldable top, a movable locking device for locking said top when unfolded, a member shiftable in one direction for moving said locking device into locking position, a clutch associated with said member in such manner that the member is shiftable relative to the clutch, and means for shifting said member relative to the clutch to move said locking device into locking position, said means being thereafter rotatable to rotate said member and cause engagement of the clutch therewith and thereby prevent movement of said locking device out of locking position.

15. In a vehicle body, a foldable top including a front transverse header structure, a movable locking device mounted on said structure, push and pull operated means for moving said device into locking position, a push and pull pivoted handle operatively engaged with the first means for operation thereof and rotatable about a second axis disposed angularly to the axis of pivoting, screw means rotatable with the handle about the second axis, and means engaged with the screw means in screw driven relation for selectively restraining push and pull operation of the first means upon rotation of the handle about the second axis.

16. In a vehicle body, a foldable top including a front transverse header structure, a movable locking device mounted on said structure, push and pull operated means for moving said device into locking position, a push and pull pivoted handle operatively engaged with the first means for operation thereof and rotatable about a second axis disposed angularly to the axis of pivoting, means rotatable with the handle about the second axis, and mechanism engaging the latter means for operation thereby upon rotation of the handle about the second axis and being operative to engage the push and pull operated means to prevent push and pull operation thereof.

EVERETT E. LUNDBERG.
TRYGVE VIGMOSTAD.

REFERENCES CITED

The following references are of record in the file of this patent:

UNITED STATES PATENTS

| Number | Name | Date |
| --- | --- | --- |
| 2,014,284 | Mobbs | Sept. 10, 1935 |
| 2,109,710 | Saives | Mar. 1, 1938 |
| 2,201,330 | Wernig et al. | May 21, 1940 |
| 2,305,715 | Keller | Dec. 22, 1942 |
| 2,360,524 | Simpson | Oct. 17, 1944 |
| 2,411,945 | Vigmostad et al. | Dec. 3, 1946 |